United States Patent
Jakoby et al.

(10) Patent No.: US 9,673,921 B1
(45) Date of Patent: Jun. 6, 2017

(54) WIRELESS FIDELITY (WI-FI) CLEAR CHANNEL ASSESMENT (CCA) DETECTION AND TRANSMISSION DECISION MAKING IN A PORTABLE DEVICE

(71) Applicant: Intel IP Corporation, Santa Clara, CA (US)

(72) Inventors: Assi Jakoby, Herzelia (IL); Ido Ouzieli, Tel Aviv (IL); Ross Rony, Haifa (IL)

(73) Assignee: Intel IP Corporation, Santa Clara, CA (US)

( * ) Notice: Subject to any disclaimer, the term of this patent is extended or adjusted under 35 U.S.C. 154(b) by 0 days.

(21) Appl. No.: 14/757,815

(22) Filed: Dec. 26, 2015

(51) Int. Cl.
| | |
|---|---|
| H04W 24/08 | (2009.01) |
| H04B 17/318 | (2015.01) |
| H04W 24/02 | (2009.01) |
| H04L 12/26 | (2006.01) |
| H04B 17/26 | (2015.01) |

(52) U.S. Cl.
CPC .......... H04B 17/318 (2015.01); H04L 43/16 (2013.01); H04W 24/02 (2013.01)

(58) Field of Classification Search
None
See application file for complete search history.

(56) References Cited

U.S. PATENT DOCUMENTS

| | | | |
|---|---|---|---|
| 9,191,848 B2 * | 11/2015 | Carbajal | H04W 24/08 |
| 2008/0048914 A1 * | 2/2008 | Smith | G01S 5/021 |
| | | | 342/464 |
| 2014/0153418 A1 * | 6/2014 | Hariharan | H04W 24/10 |
| | | | 370/252 |
| 2015/0110077 A1 * | 4/2015 | Lee | H04W 48/20 |
| | | | 370/332 |
| 2016/0063847 A1 * | 3/2016 | Hawkins | G08B 21/24 |
| | | | 340/539.11 |
| 2016/0148497 A1 * | 5/2016 | Shapiro | G05B 23/0232 |
| | | | 340/514 |
| 2016/0328955 A1 * | 11/2016 | Shapiro | G05B 23/0232 |

* cited by examiner

*Primary Examiner* — Eunsook Choi
(74) *Attorney, Agent, or Firm* — Forefront IP Lawgroup of Christie and Rivera, PLLC

(57) ABSTRACT

Described herein are technologies related to an implementation of Wi-Fi CCA detection and transmission decision making using a histogram data block. For example, the histogram data block facilitates threshold values that are used for the transmission decision making to avoid Wi-Fi signal retransmission and/or collision.

20 Claims, 6 Drawing Sheets

US 9,673,921 B1

WIRELESS FIDELITY (WI-FI) CLEAR CHANNEL ASSESMENT (CCA) DETECTION AND TRANSMISSION DECISION MAKING IN A PORTABLE DEVICE

BACKGROUND

Wireless communication systems may use one or more channels to transfer data between a transmitter and receivers. These communication systems may operate according to a set of standards defined, for example, by the Institute of Electrical and Electronics Engineers (IEEE) 802.11 committee for Wireless Local Area Network (WLAN) communication.

According to a Wi-Fi standard, in order for a Wi-Fi modem to perform Wi-Fi signal transmission, there is a need to check that surrounding air interface is clear of any neighboring Wi-Fi signal sources, or other unlicensed wireless technology transmissions (i.e., there is no other unlicensed wireless technology device in the area which is currently transmitting at the same channel as the Wi-Fi modem). Since the neighbor transmission is not regularly received and/or identified in a clear manner (e.g., preamble is not correctly received), it may be enough to detect an interfering energy (not necessarily identified as Wi-Fi) to prevent Wi-Fi signal transmission operation by a device. This process may be referred to as clear channel assessment (CCA) process.

As such, there is a need to improve Wi-Fi CCA detection for efficient transmission decision making as described in present implementations herein.

DETAILED DESCRIPTION

Figure 1:
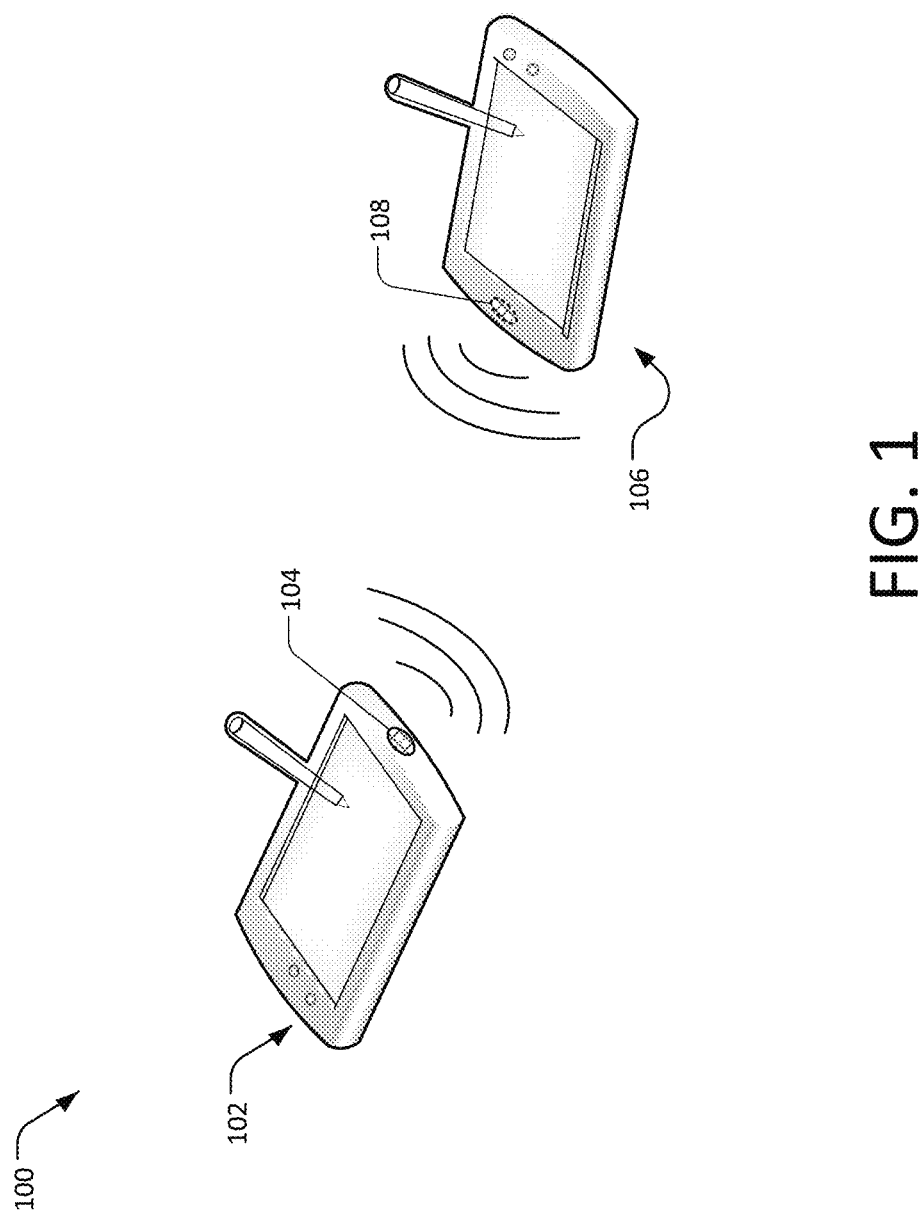
FIG. 1 illustrates an example scenario that implements an efficient Wi-Fi CCA detection in a transceiver circuitry of a portable device.

Described herein is a technology for implementing wireless fidelity (Wi-Fi) Clear Channel Assessment (CCA) detection in a device. For example, to avoid Wi-Fi signal and/or collision, which may increase Wi-Fi latency, the implementations described herein may include a histogram data block that stores a different set of received signal strength indicator (RSSI) percentage plot data for a signal range that is higher than a first threshold value of −62 dBm, and for the signal range that is lower than the first threshold value.

The stored set of RSSI percentage plot data for the signal range that is higher than the first threshold value (e.g., −62 dBm) may be utilized to determine whether a signal that is detected by the device is due to an internal transmission within the device, or due to external wireless signal sources. For example, when the detected signal is due to the internal transmission within the device (i.e., based from the histogram data block), then a Wi-Fi signal transmission may be performed by the device. Otherwise, when the detected signal is due to any neighboring external wireless signal source, then no Wi-Fi signal transmission by the device is performed. In this example, a co-running long term evolution (LTE) transmission is assumed to be present during process of determining whether the detected signal is a hidden internal signal or external to the device. Furthermore, the stored set of RSSI percentage plot data for the signal range that is higher than the first threshold value may be collected when there is no LTE transmission that is currently running in the device.

On the other hand, the stored set of RSSI percentage plot data for the signal range that is lower than the first threshold value (e.g., −62 dBm) may be utilized to determine whether the signal that is detected by the device is due to the internal transmission within the device, or due to an external Wi-Fi signal source(s). The reason being, when the RSSI of the detected signal is lesser than the first threshold value, then the Wi-Fi transmission by the device may be limited by external Wi-Fi signal sources. To this end, when the detected signal (with RSSI<first threshold value) is due to the internal transmission within the device or external non-Wi-Fi signal sources, then the transmission of the Wi-Fi signals by the device is performed. Otherwise, when the detected signal (with RSSI<first threshold value) is due to the external Wi-Fi signal source as derived from the histogram data block, then the device defers Wi-Fi signal transmission so as not to interfere with the currently transmitting Wi-Fi signal source. In this scenario, it is assumed that there is co-running LTE transmission during the process of determining whether the detected signal (with RSSI<first threshold value) is due to the external Wi-Fi signal source or not.

As described herein, the signal range that is lower than the first threshold value (e.g., −62 dBm) may be between −62 dBm to −82 dBm since the signal below −82 dBm may be ignored as non-interfering signal. That is, internal or external wireless signal sources with RSSI below −82 dBm may not affect the implementations described herein.

The external wireless signal sources as described above for the signal range that is higher than the first threshold value (e.g., −62 dBm) may include an external LTE transmission, an external Wi-Fi signal transmission, an external Bluetooth (BT) transmission, and the like.

FIG. 1 is an example scenario 100 that utilizes an efficient Wi-Fi CCA detection in a transceiver circuitry of a portable device. The Wi-Fi CCA detection as described herein may increase total packet transmission (TPT) and latency in an environment where there may be an interference from internal or external LTE, cellular uplink, BT concurrent transmission, and the like. The scenario 100 shows a portable device 102 with an antenna 104, and another portable device 106 with an antenna 108.

The portable devices 102 or 106 may include, but is not limited to, a tablet computer; a netbook, a notebook computer, a laptop computer; mobile phone, a cellular phone, a smartphone, a personal digital assistant, a multimedia playback device, a digital music player, a digital video player, a navigational device, a digital camera, and the like.

The portable device 102, for example, may communicate with the other portable device 106 in a network environment. The network environment, for example, includes a cellular network base station configured to facilitate communications between the portable device 102 and the other portable device 106. During this cellular network communications, detected wireless signals such as external LTE transmissions, Bluetooth (BT) transmissions, external Wi-Fi transmissions and the like, may interfere with Wi-Fi communication features of the portable devices 102 and 106. Thus, the implementations described herein may facilitate interference or harmonic spurs mitigation, for example, of the interfering detected signal to the Wi-Fi wireless communications in the portable device 102.

Figure 2:
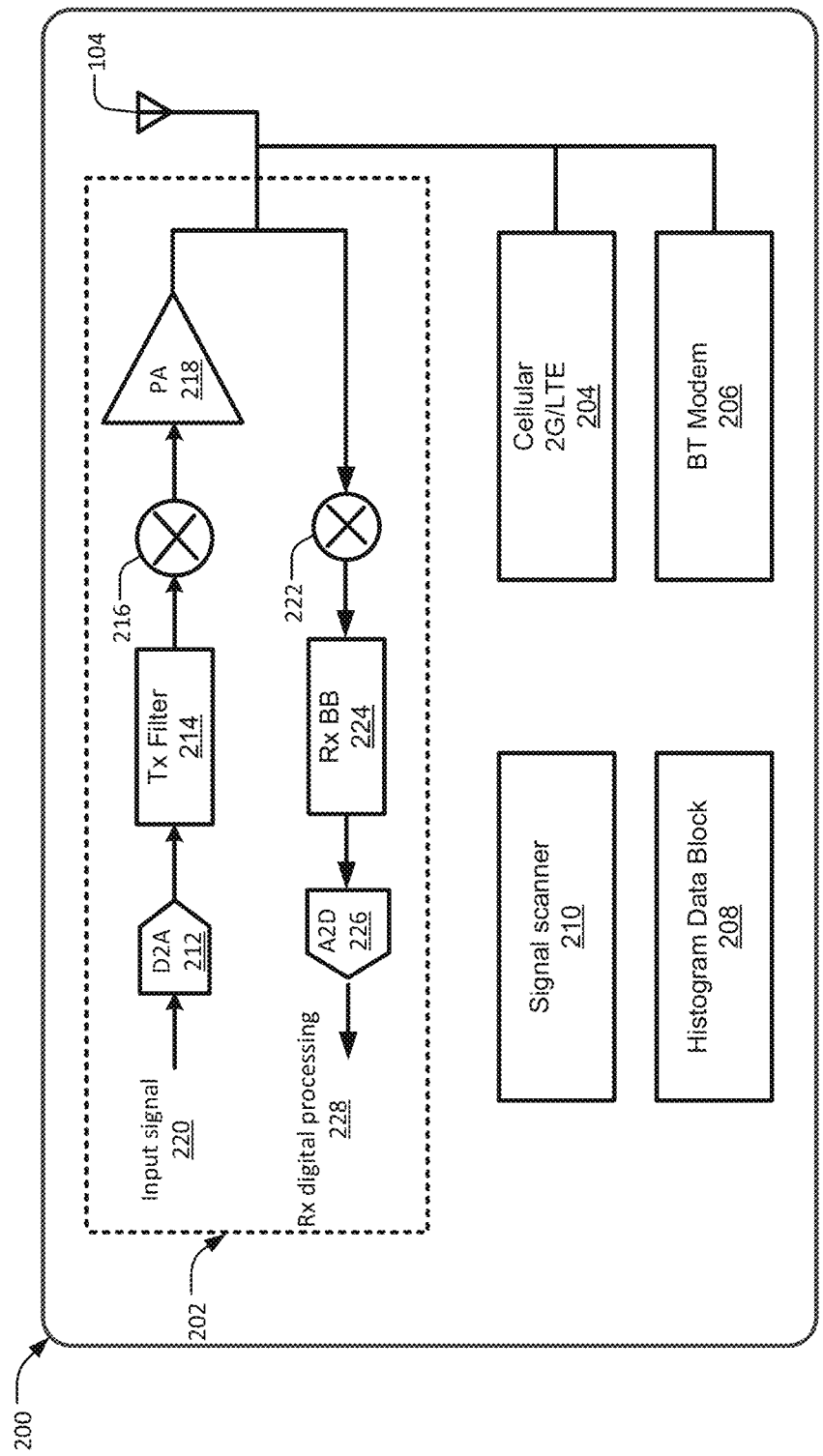
FIG. 2 is an example schematic block diagram of a portable device transceiver as described in present implementations herein.

FIG. 2 is an example schematic block diagram of a portable device transceiver 200 as described in present implementations herein. The portable device transceiver 200 may include a Wi-Fi modem 202, a cellular modem 204, and a BT modem 206 to enable the device to communicate through an access point (AP), cellular network base station, and BT radio waves, respectively. Furthermore, the portable device transceiver 200 shows a histogram data block 208, a signal scanner 210, and the antenna 104. Furthermore still, a transmit chain of the Wi-Fi modem 202 may further include, but not limited to, a digital to analog converter (D2A) 214, a filter 214, a mixer 216, and an analog PA 220 to process an input signal 220. On the other hand, a receiver chain of the Wi-Fi modem 202 may further include, but not limited to, receiver mixer 222, a receiver baseband filter 224, and an analog to digital converter (A2D) 226 that supplies digital baseband signals to a receiver digital processing 228. It is also to be understood that portable transceiver 200 may include one or more processors and one or more memory components (not shown).

As an example of present implementations herein, the histogram data block 208 may include datasets (e.g., RSSI percentage plot) of wireless signal sources, which are collected through the signal scanner 210 when the cellular modem 204, for example, is at inactive state (i.e., not transmitting). For example, during inactive LTE transmission, the signal scanner 210 may periodically scan any external wireless signal sources (e.g., external LTE, Wi-Fi, BT, etc.) with RSSI-signal range of −62 dBm or higher i.e., equal to or higher than a pre-configured first threshold value of −62 dBm. In this example, the signal scanner 210 may further scan and store identification features of the scanned external wireless signal sources to the histogram data block 208. The identification features may include, but not limited to, received RSSI, geo-location, service set identification (SSID), a unique basic service set identification (BSSID), a media access card (MAC) address, data packet air time, or a combination thereof, of the external wireless signal sources.

In another scenario, for RSSI-signal range lower than the −62 dBm (but not any lower than −82 dBm), the histogram data block 208 may be limited to store datasets (e.g., RSSI percentage plot) of external Wi-Fi signal sources. That is, the histogram data block 208 need not store external LTE transmissions, external BT transmissions, or any other non-Wi-Fi signal sources as they may not affect Wi-Fi signal transmissions by the portable device 102 at this signal range i.e., −62 dBm to −82 dBm. In this other scenario, the signal scanner 210 may similarly scan periodically the external Wi-Fi signal sources with RSSI-signal range of lower than the 62 dBm, and store their corresponding identification features to the histogram data block 208.

In other implementations, the histogram data block 208 (through the processor) may be configured to set its own histogram moving window time; to be able to clear histogram history, to restart its histogram count, and to set its method of averaging such as percentages of neighboring wireless transmission as further illustrated in FIG. 3. For example, corresponding percentages of the identified neighboring Wi-Fi signal sources—with RSSI-signal range lower than the −62 dBm—may be defined by the received RSSI over histogram window time. In this example, the signal scanner 210 collects the RSSI and its corresponding air time duration, and stores the collected RSSI and air time duration to the histogram data block 208. The histogram data block 208 may then generate a percentage of occurrence of a neighboring Wi-Fi signal source with the same level of RSSI. The percentage of occurrence, as described herein, may be utilized to determine whether the detected signal is internal or due to external wireless signal sources.

While the signal scanner 210 may detect and collect the identification features of the external Wi-Fi sources during inactive LTE uplink transmission, BT transmission, and the like, the signal scanner 210 may also be configured to detect and collect the identification feature such as the RSSI of the external wireless signals while the portable device 102 is performing LTE uplink transmission.

With the stored data in the histogram data block 208, the stored data is utilized when the portable device 102 (with active LTE transmission) is en route to a particular place. For example, in a particular shopping mall, the signal scanner 210 of the portable device 102 detects a signal and identifies the detected signal to be a Wi-Fi signal source based on its RSSI-signal range of −70 dBm, which may be found on the histogram data block 208. In this example, the Wi-Fi modem 202 may defer Wi-Fi transmission since the detected signal from the identified external Wi-Fi signal may be interfered upon by the Wi-Fi transmission from the Wi-Fi modem.

In another example, such as in a particular sports arena, the signal scanner 210 of the portable device 102 (with active LTE transmission) detects and identifies a signal with a measured RSSI-signal range of −50 dBm. In this example, if the −50 dBm signal is not identified or found on the histogram data block 208, then the −50 dBm signal is assumed to be internal to the device. As such, the Wi-Fi modem 202 may perform Wi-Fi transmission. Otherwise, if the −50 dBm signal is identified or found on the histogram data block 208 to be coming from an external wireless signal, then the −50 dBm signal may block Wi-Fi transmission by the Wi-Fi modem 202.

In both examples as described above, the stored datasets in the histogram data block 208 for the RSSI-signal range that is equal to or higher than the −62 dBm (first threshold value) may facilitate a determination of whether or not the detected signal is due to the internal transmission within the device, or due to any external wireless signal sources. On the other hand, the stored datasets in the histogram data block 208 for the RSSI-signal range that is lower than −62 dBm (but not any lower than −82 dBm) may facilitate a determination of whether or not the detected signal is due to the internal transmission within the device, or due to external Wi-Fi signal sources.

As such, the histogram data block 208 may be configured to store a different set of RSSI percentage plot data for the RSSI-signal range that is equal or higher than the first threshold value of −62 dBm, and for the RSSI-signal range that is lower than the first threshold value.

In a case where there is no co-running LTE transmission or internal signal within the portable device transceiver 200 during the detection of the signal, it is assumed that the detected signal is an external signal and similar implementations described above may be applied. In other words, for the detected signal with RSSI-signal range that is equal or higher than the first threshold value of −62 dBm, there will be no Wi-Fi signal transmission by the modem 202. On the other hand, for the detected signal with RSSI-signal range that is lower than the first threshold value of −62 dBm, there will be a deferring of Wi-Fi signal transmission by the modem 202 when the detected signal is an external Wi-Fi signal source.

With continuing reference to FIG. 2, the input signal 220 may include an original Wi-Fi signal to be transmitted. The input signal 220 is converted into analog signal, filtered, and amplified through the PA 218 prior to transmission through the antenna 104. For Wi-Fi signal receiving, a received signal may be first amplified, down-converted, and converted into digital baseband signals for further processing at the Rx digital processing 228.

Although the example portable device transceiver 200 illustrates in a limited manner basic components of the receiver of the portable device, other components such as battery, one or more processors, SIM card, etc. were not described in order to simplify the embodiments described herein. For example, the one or more processors may be configured to perform comparison of the detected signals to the threshold values as described above.

Figure 3A:
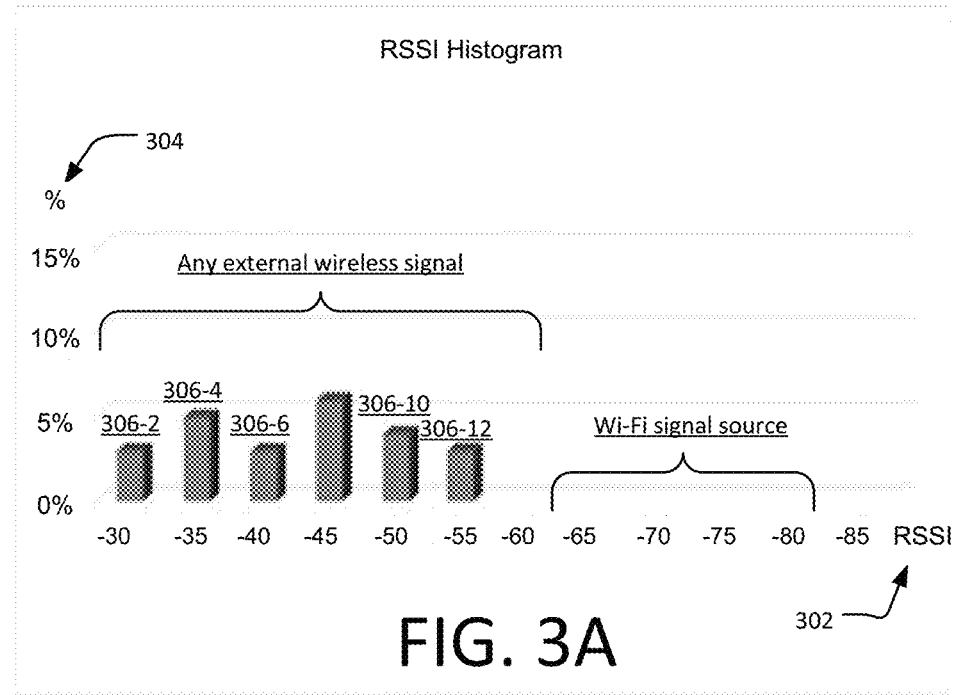
FIGS. 3A and 3B illustrate example illustrations of plotted stored data from a histogram data block for different portable device geo-locations as described in present implementations herein.
Figure 3B:
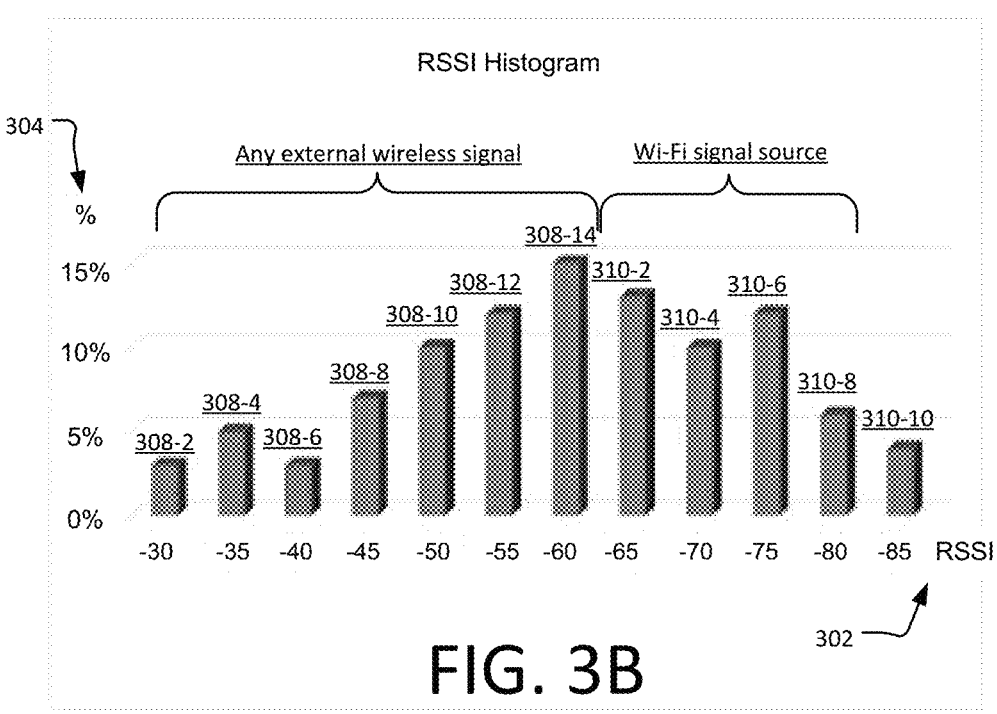

FIGS. 3A and 3B are example illustrations of plotted stored data from the histogram data block for different device geo-locations. The plotted stored data in FIG. 3A, for example, shows a percentage plot of RSSIs 302 versus RSSI percentage occurrence 304 for each particular external signal source 306. That is, the RSSIs 302 may include the measured RSSIs corresponding to each external signal sources 306 whose identification features were previously collected and stored on the histogram data block 208 for RSSI-signal range that is higher than the first threshold value.

On the other hand, the RSSI percentage occurrence 304 may include an amount of percentage that the external wireless signal source 306 is present within range of the portable device. As opposed to FIG. 3A, for another device geo-location, the plotted stored data in FIG. 3B shows another set of wireless signal sources 308-2 to 308-14 (i.e., RSSI-signal range that is equal to −62 dBm or higher), and Wi-Fi signal sources 310-2 to 310-10 for collected RSSI-signal range that is lower than −62 dBm. As described herein, the set of wireless signal sources 308-2 to 308-14 may be utilized to determine whether a detected signal is due to internal transmission or any external wireless signals, while the Wi-Fi signal sources 310-2 to 310-10 may be utilized to determine whether a detected signal is due to internal transmission or external Wi-Fi signal sources.

For example, when the portable device 102 (with active LTE transmission) is located on a particular place (e.g., office), the plotted data in FIG. 3A may be utilized to determine whether a RSSI signal that is detected by the portable device 102 at the particular place or office may be coming from internal or external wireless signal sources 306. In a case where the detected RSSI signal measures −64 dBm, which is not identified or found from the plotted data in FIG. 3A, then the detected RSSI signal is presumed to be an internal transmission within the portable device 102. As such, the Wi-Fi modem 202 may perform Wi-Fi signal transmission.

In another example, the signal scanner 210 detects and measures a signal with an RSSI of −55 dBm. In this example, based from the plotted data in FIG. 3A, the measured RSSI signal may most probably be generated by the wireless signal source 306-12. As such, the Wi-Fi modem 202 may not perform Wi-Fi signal transmission due to presence of external wireless signal that is above the first threshold value i.e., −62 dBm.

With continuing reference to FIG. 3B, when the portable device 102 (with active LTE transmission) is located at another place (e.g., shopping mall), the plotted data in FIG. 3B is utilized to determine whether the detected external signal is transmitted from the wireless signal sources 308 or Wi-Fi signal sources 310.

For example, in a case where the detected RSSI signal measures −40 dBm, which is identified from the plotted data in FIG. 3B with very low probability, then the detected RSSI signal can be safely presumed to be an internal transmission within the portable device 102. As such, the Wi-Fi modem 202 may perform Wi-Fi signal transmission. In this scenario, the plotted data in FIG. 3B may be considered for purposes of determining whether the detected signal is due to the internal or the Wi-Fi signal sources.

However, in the same example, in a case where the detected RSSI signal measures −75 dBm, which is identified or found from the plotted data in FIG. 3B as Wi-Fi signal source 310-6, then the detected RSSI signal is presumed to be from the external and not an internal transmission within the portable device 102. As such, the Wi-Fi modem 202 may defer Wi-Fi signal transmission in order to avoid generation of interference to currently transmitting Wi-Fi signal source 310-6. In an implementation, the deferral of the Wi-Fi signal transmission may be implemented when the measured RSSI is between −62 dBm to −82 dBm.

Figure 4:
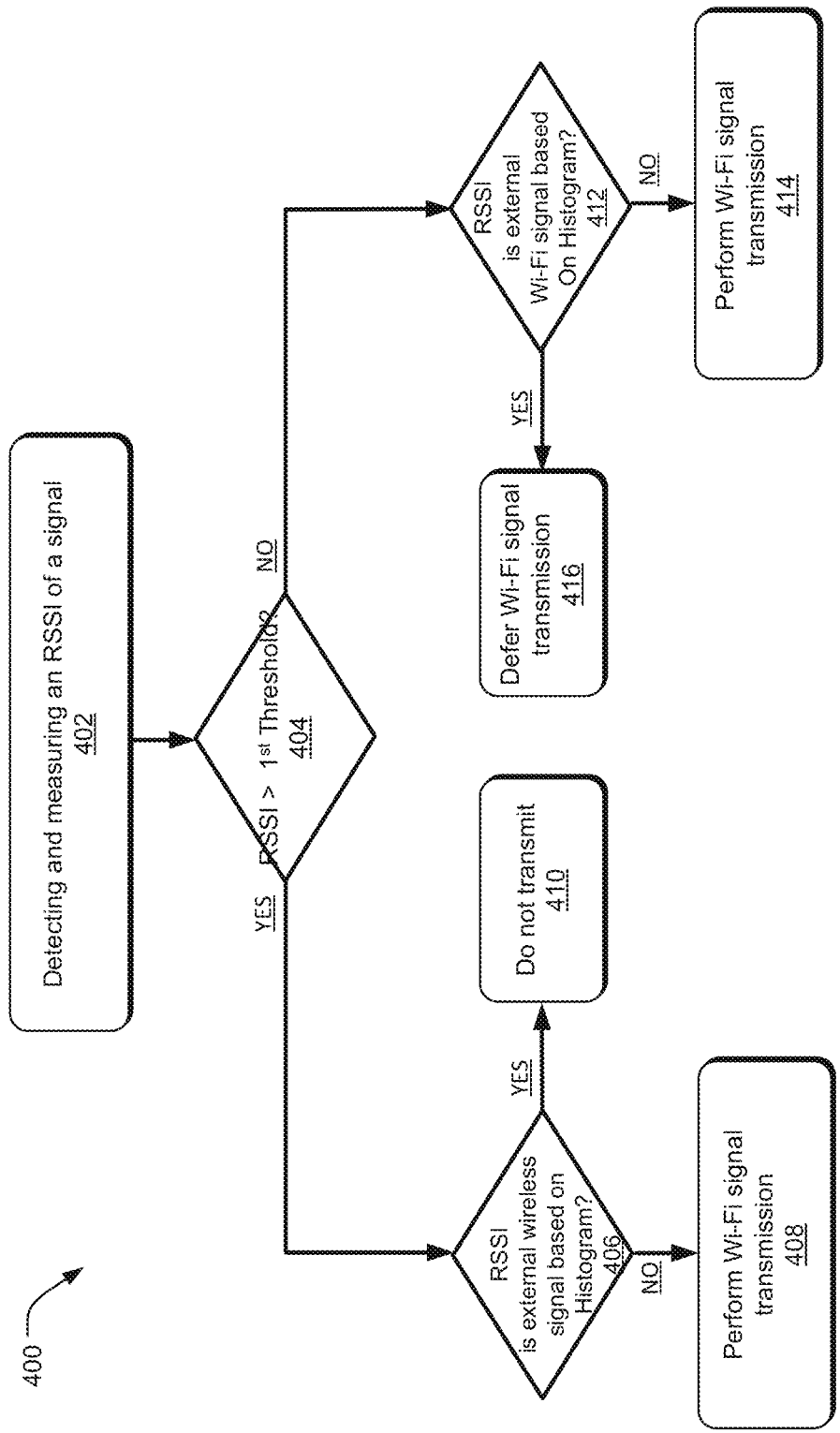
FIG. 4 illustrates an exemplary process for implementing Wi-Fi CCA detection in a transceiver of a portable device.

FIG. 4 shows an example process flowchart 400 illustrating an example method for implementing Wi-Fi CCA detection in a transceiver of a portable device. The order in which the method is described is not intended to be construed as a limitation, and any number of the described method blocks may be combined in any order to implement the method, or alternate method. Additionally, individual blocks may be deleted from the method without departing from the spirit and scope of the subject matter described herein. Furthermore, the method may be implemented in any suitable hardware, software, firmware, or a combination thereof, without departing from the scope of the invention.

At block 402, detecting and measuring an RSSI of a signal is performed. For example, the signal scanner 210 (during active LTE transmission by the cellular modem 204) is configured to detect the identification features of a signal. In this example, the detecting of identification feature may include measurements of RSSI of the signal. In this example still, the active LTE transmission is assumed since the implementations described herein facilitates a determination of whether the detected signal is hidden internally or produced by an external wireless signal source.

At block 404, determining whether the measured RSSI of the signal is greater than a first threshold is performed. For example, the first threshold is configured to include an amount of −62 dBm. In this example, when the measured RSSI (e.g., measured RSSI of −60 dBm) of the signal is equal to or greater than the first threshold, then at block 406, a determination is performed as to whether the detected signal is due to an internal transmission within the device, or due to a neighboring wireless signal source.

For example, at block 406, stored contents of the histogram data block 208 for RSSI-signal range that is equal to or higher than −62 dBm is utilized to determine whether the detected signal is due to internal transmission within the device, or due to a neighboring wireless signal source.

If the detected signal is not found or identified on the stored contents of the histogram data block 208, then at block 408, Wi-Fi signal transmission is performed because the detected signal is due to internal transmission (e.g., LTE transmission) within the device. However, if the signal is found or identified through the histogram data block 208 to be any external wireless signals, then at block 410, the Wi-Fi signal transmission is not performed since the detected signal may be due to the neighboring wireless transmission that is equal or greater than −62 dBm and not due to internal transmissions within the device.

Referring back to block 404, when the measured RSSI (e.g., measured RSSI of −70 dBm) of the detected signal is lesser than the first threshold of −62 dBm, then at block 412, a determination is performed as to whether the detected signal is due to internal transmission within the device, or due to a neighboring Wi-Fi signal.

For example, at block 412, stored contents of the histogram data block 208 are utilized to determine whether the detected signal is due to internal transmission within the device, or due to neighboring Wi-Fi signal. In this example, the stored contents of the histogram data block at block 412 are different from the stored contents of the histogram data block at block 406 since the collected data for the histogram data block at block 412 for the range −62 dBm to −82 dBm may substantially include Wi-Fi signal sources. As opposed to the range that is equal to or above the −62 dBm threshold, the histogram data block at block 406 may include different kinds of detected and measured signals such as, but not limited to, LTE signals, BT signals, and the like.

As such, if the detected signal is not found or identified through the histogram data block on block 412, then at block 414, Wi-Fi signal transmission is performed because the detected signal is due to the internal transmission within the device. That is, the histogram data block 208 does not show presence of Wi-Fi signals 310-2 to 310-10 that may facilitate deferral of the Wi-Fi signal transmission.

However, if the detected signal is found or identified through the histogram data block 208, then at block 416, the Wi-Fi signal transmission may be deferred because the detected signal is found from the Wi-Fi signals 310-2 to 310-10 of the histogram data block 208 and not due to internal transmissions within the device. In block 416, the deferring of the Wi-Fi signal transmission is implemented to avoid collision with currently transmitting Wi-Fi signal source based from the histogram data block 208.

In an implementation where the LTE transmission from the cellular modem 204 is not active during the signal detection, then the detected signal is assumed to be an external signal. In this implementation, the step on block 406 may result to non-transmission of Wi-Fi signals at block 410 since the detected signal is assumed to be any wireless signal. On the other hand, on block 412, the Wi-Fi signal transmission by the Wi-Fi modem 202 may be deferred depending upon whether or not the detected signal is found on the histogram data block for Wi-Fi signal sources at signal range −62 dBm to −82 dBm. That is, if the detected signal is found or identified from the histogram data block, then deferred Wi-Fi signal transmission is performed. Otherwise, there is no need to defer Wi-Fi signal transmission since external non-Wi-Fi signal sources may not affect Wi-Fi signal transmission at signal range −62 dBm to −82 dBm.

In the implementation described above, the first threshold may not be limited to −62 dBm threshold. Other amount of threshold may be configured without affecting the implementations described.

Figure 5:
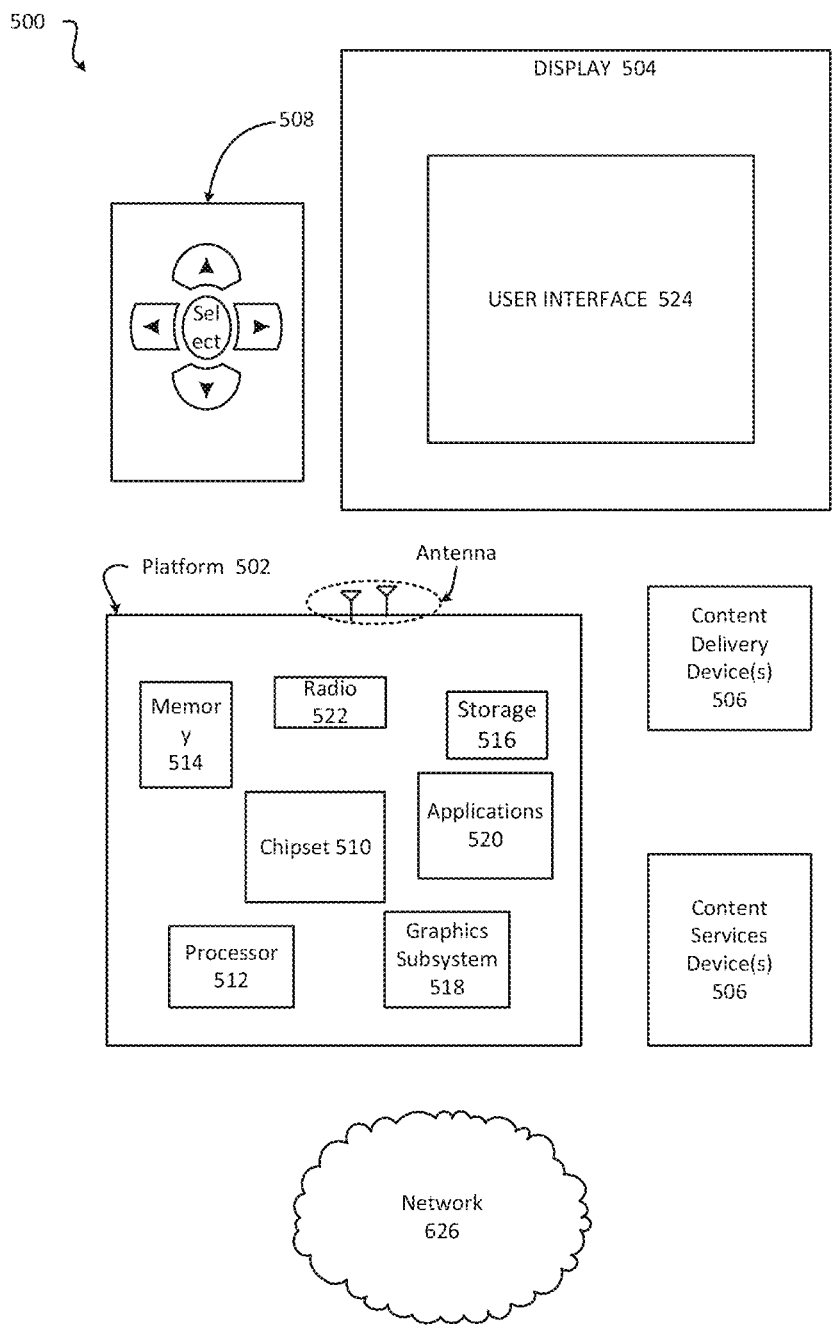
FIG. 5 illustrates an example system of a device that utilizes Wi-Fi CCA detection in a transceiver in accordance with implementations herein.

FIG. 5 illustrates an example system 500 of a device in accordance with the present disclosure. For example, the portable device 102 is a circuitry block within the example system 500. In various implementations, the system 500 may be a media system although system 500 is not limited to this context. For example, system 500 may be incorporated into a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

In various implementations, system 500 includes a platform 502 coupled to a display 504. Platform 502 may receive content from a content device such as content services device(s) 506 or other similar content sources. A navigation controller 508 including one or more navigation features may be used to interact with, for example, platform 502 and/or display 504. Each of these components is described in greater detail below.

In various implementations, platform 502 may include any combination of a chipset 510, processor 512, memory 514, storage 516, graphics subsystem 518, applications 520 and/or radio 522. Chipset 510 may provide intercommunication among processor 512, memory 514, storage 516, graphics subsystem 518, applications 520 and/or radio 522. For example, chipset 510 may include a storage adapter (not depicted) capable of providing intercommunication with storage 516.

Processor 512 may be implemented as a Complex Instruction Set Computer (CISC) or Reduced Instruction Set Computer (RISC) processors, x86 instruction set compatible processors, multi-core, or any other microprocessor or central processing unit (CPU). In various implementations, processor 510 may be dual-core processor(s), dual-core mobile processor(s), and so forth.

Memory 514 may be implemented as a non-volatile memory device such as, the PCM memory cell. In an implementation, the memory 514 is coupled to the processor 512 and a transceiver circuit (e.g., radio 522), which utilizes the apparatus 200 in its circuitry block.

Storage 516 may be implemented as another non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In various implementations, storage 516 may include technology to increase the storage performance enhanced protection for valuable digital media when multiple hard drives are included, for example.

Graphics subsystem 518 may perform processing of images such as still or video for display. Graphics subsystem 518 may be a graphics processing unit (GPU) or a visual processing unit (VPU), for example. An analog or digital interface may be used to communicatively couple graphics subsystem 518 and display 504. For example, the interface may be any of a High-Definition Multimedia Interface, Display Port, wireless HDMI, and/or wireless HD compliant techniques. Graphics subsystem 518 may be integrated into processor 512 or chipset 510. In some implementations, graphics subsystem 518 may be a stand-alone card communicatively coupled to chipset 510.

The graphics and/or video processing techniques described herein may be implemented in various hardware architectures. For example, graphics and/or video functionality may be integrated within a chipset. Alternatively, a discrete graphics and/or video processor may be used. As still another implementation, the graphics and/or video functions may be provided by a general-purpose processor, including a multi-core processor. In further embodiments, the functions may be implemented in a consumer electronics device.

Radio 522 may include one or more radios capable of transmitting and receiving signals using various suitable wireless communications techniques. Such techniques may involve communications across one or more wireless networks. Example wireless networks include (but are not limited to) wireless local area networks (WLANs), wireless personal area networks (WPANs), wireless metropolitan area network (WMANs), cellular networks, and satellite networks. In communicating across such networks, radio 518 may operate in accordance with one or more applicable standards in any version. Furthermore, the radio 522 is a part of a transceiver block in the system 500 that may utilize the portable device 102 in its circuitry block.

In various implementations, display 504 may include any television type monitor or display. Display 504 may include, for example, a computer display screen, touch screen display, video monitor, television-like device, and/or a television. Display 504 may be digital and/or analog. In various implementations, display 504 may be a holographic display. In addition, display 504 may be a transparent surface that may receive a visual projection. Such projections may convey various forms of information, images, and/or objects. For example, such projections may be a visual overlay for a mobile augmented reality (MAR) application. Under the control of one or more software applications 520, platform 502 may display user interface 524 on display 504.

In various implementations, content services device(s) 506 may be hosted by any national, international and/or independent service and thus accessible to platform 502 via the Internet, for example. Content services device(s) 506 may be coupled to platform 502 and/or to display 504. Platform 502 and/or content services device(s) 506 may be coupled to a network 526 to communicate (e.g., send and/or receive) media information to and from network 526. Content delivery device(s) 506 also may be coupled to platform 502 and/or to display 504.5

In various implementations, content services device(s) 506 may include a cable television box, personal computer, network, telephone, Internet enabled devices or appliance capable of delivering digital information and/or content, and any other similar device capable of unidirectionally or bidirectionally communicating content between content providers and platform 502 and/display 504, via network 526 or directly. It will be appreciated that the content may be communicated unidirectionally and/or bidirectionally to and from any one of the components in system 500 and a content provider via network 526. Examples of content may include any media information including, for example, video, music, medical and gaming information, and so forth.

Content services device(s) 506 may receive content such as cable television programming including media information, digital information, and/or other content. Examples of content providers may include any cable or satellite television or radio or Internet content providers. The provided examples are not meant to limit implementations in accordance with the present disclosure in any way.

In various implementations, platform 502 may receive control signals from navigation controller 508 having one or more navigation features. The navigation features of controller 508 may be used to interact with user interface 524, for example. In embodiments, navigation controller 508 may be a pointing device that may be a computer hardware component (specifically, a human interface device) that allows a user to input spatial (e.g., continuous and multi-dimensional) data into a computer. Many systems such as graphical user interfaces (GUI), and televisions and monitors allow the user to control and provide data to the computer or television using physical gestures.

Movements of the navigation features of controller 508 may be replicated on a display (e.g., display 504) by movements of a pointer, cursor, focus ring, or other visual indicators displayed on the display. For example, under the control of software applications 520, the navigation features located on navigation controller 506 may be mapped to virtual navigation features displayed on user interface 524, for example. In embodiments, controller 506 may not be a separate component but may be integrated into platform 502 and/or display 504. The present disclosure, however, is not limited to the elements or in the context shown or described herein.

In various implementations, drivers (not shown) may include technology to enable users to instantly turn on and off platform 502 like a television with the touch of a button after initial boot-up, when enabled, for example. Program logic may allow platform 502 to stream content to media adaptors or other content services device(s) 506 or content delivery device(s) 506 even when the platform is turned "off." In addition, chipset 510 may include hardware and/or software support for 5.1 surround sound audio and/or high definition 7.1 surround sound audio, for example. Drivers may include a graphics driver for integrated graphics platforms. In embodiments, the graphics driver may comprise a peripheral component interconnect (PCI) Express graphics card.

In various implementations, any one or more of the components shown in system 500 may be integrated. For example, platform 502 and content services device(s) 506 may be integrated, or platform 502 and content delivery device(s) 506 may be integrated, or platform 502, content services device(s) 506, and content delivery device(s) 506 may be integrated, for example. In various embodiments, platform 502 and display 504 may be an integrated unit. Display 504 and content service device(s) 506 may be integrated, or display 504 and content delivery device(s) 506 may be integrated, for example. These examples are not meant to limit the present disclosure.

In various embodiments, system 500 may be implemented as a wireless system, a wired system, or a combination of both. When implemented as a wireless system, system 500 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, system 500 may include components and interfaces suitable for communicating over wired communications media, such as input/output (I/O) adapters, physical connectors to connect the I/O adapter with a corresponding wired communications medium, a network interface card (NIC), disc controller, video controller, audio controller, and the like. Examples of wired communications media may include a wire, cable, metal leads, printed circuit board (PCB), backplane, switch fabric, semiconductor material, twisted-pair wire, co-axial cable, fiber optics, and so forth.

Platform 502 may establish one or more logical or physical channels to communicate information. The information may include media information and control information. Media information may refer to any data representing content meant for a user. Examples of content may include, for example, data from a voice conversation, videoconference, streaming video, electronic mail ("email") message, voice mail message, alphanumeric symbols, graphics, image, video, text and so forth. Data from a voice conversation may be, for example, speech information, silence periods, background noise, comfort noise, tones and so forth. Control information may refer to any data representing commands, instructions or control words meant for an automated system. For example, control information may be used to route media information through a system, or instruct a node to process the media information in a predetermined manner. The embodiments, however, are not limited to the elements or in the context shown or described in FIG. 5.

Figure 6:
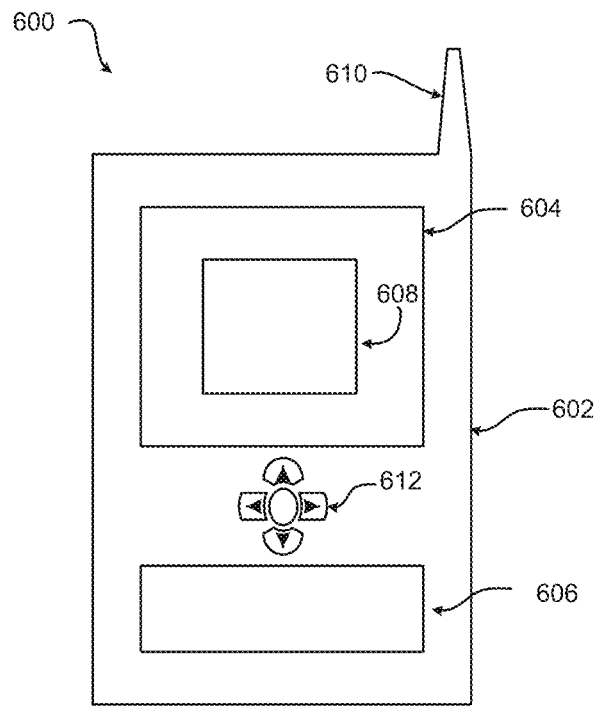
FIG. 6 illustrates an example device that utilizes Wi-Fi CCA detection in a transceiver described in accordance with implementations herein.

As described above, system 500 may be embodied in varying physical styles or form factors. FIG. 6 illustrates implementations of a small form factor device 600 in which system 500 may be embodied. In embodiments, for example, device 600 may be implemented as a mobile computing device having wireless capabilities. A mobile computing device may refer to any device having a processing system and a mobile power source or supply, such as one or more batteries, for example.

As described above, examples of a mobile computing device may include a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

Examples of a mobile computing device also may include computers that are arranged to be worn by a person, such as a wrist computer, finger computer, ring computer, eyeglass computer, belt-clip computer, arm-band computer, shoe computers, clothing computers, and other wearable computers. In various embodiments, for example, a mobile computing device may be implemented as a smart phone capable of executing computer applications, as well as voice communications and/or data communications. Although some embodiments may be described with a mobile computing device implemented as a smart phone by way of example, it may be appreciated that other embodiments may be implemented using other wireless mobile computing devices as well. The embodiments are not limited in this context.

As shown in FIG. 6, device 600 may include a housing 602, a display screen 604, an input/output (I/O) device 606, a network interface card (NIC) 608 and a transceiver component 610. Device 600 also may include navigation features 612. The display screen 604 may include any suitable display unit for displaying information appropriate for a mobile computing device. For example, the display screen 604 displays the personalized message that the personalized communication program may generate. The I/O device 606 may include any suitable I/O device or user interface (UI) for entering information into a mobile computing device such as when a user opts-in to the personalized communication program. Examples for I/O device 606 may include an alphanumeric keyboard, a numeric keypad, a touch pad, input keys, buttons, switches, rocker switches, microphones, speakers, voice recognition device and software, and so forth. Information also may be entered into device 500 by way of microphone (not shown). Such information may be digitized by a voice recognition device (not shown). The embodiments are not limited in this context.

Various embodiments may be implemented using hardware elements, software elements, or a combination of both.

Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

While certain features set forth herein have been described with reference to various implementations, this description is not intended to be construed in a limiting sense. Hence, various modifications of the implementations described herein, as well as other implementations, which are apparent to persons skilled in the art to which the present disclosure pertains are deemed to lie within the spirit and scope of the present disclosure.

Realizations in accordance with the present invention have been described in the context of particular embodiments. These embodiments are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the various configurations may be implemented as a combined structure or component. These and other variations, modifications, additions, and improvements may fall within the scope of the invention as defined in the claims that follow.

The following examples pertain to further embodiments:

Example 1 is a method of wireless fidelity (Wi-Fi) Clear Channel Assessment (CCA) detection in a device, the method comprising: detecting and measuring a received signal strength indicator (RSSI) of a signal; comparing the measured RSSI of the detected signal to a first threshold value; determining whether the detected signal is transmitted from a source internal to the device or from an external wireless signal source in response to the measured RSSI that is greater than the first threshold value; transmitting Wi-Fi signals by the device in response to a determination that the detected signal is transmitted from the source internal to the device; determining whether the detected signal is transmitted from the source internal to the device or from an external Wi-Fi signal source in response to the measured RSSI that is lesser than the first threshold value; transmitting the Wi-Fi signals by the device in response to a determination that the detected signal is transmitted from the source internal to the device; and deferring Wi-Fi signal transmission by the device in response to a determination that the detected signal is transmitted from the external Wi-Fi signal source.

In example 2, the method as recited in example 1, wherein the determination of whether the detected signal is transmitted from the source internal to the device implements a histogram data block.

In example 3, the method as recited in example 1, wherein the first threshold value is −62 dBm.

In example 4, the method as recited in example 3, wherein stored contents of the histogram data block for a signal range that is greater than the first threshold value include the RSSI of different external wireless signal sources.

In example 5, the method as recited in example 3, wherein the histogram data collects and stores data when an internal long term evolution (LTE) transmission on the device is not active.

In example 6, the method as recited in example 3, wherein the stored contents of the histogram data block for a signal range that is lesser than the first threshold value include the RSSI of different external Wi-Fi signal sources.

In example 7, the method as recited in example 1, wherein the determining of whether the detected signal is transmitted from the source internal to the device or from the external wireless signal source is based from stored contents of a histogram data block that comprise identification features of different external wireless signal sources for a signal range that is greater than the first threshold value.

In example 8, the method as recited in example 1, wherein the determining of whether the detected signal is transmitted from the source internal to the device or from the external Wi-Fi signal source is based from stored contents of a histogram data block that comprise identification features of different external Wi-Fi signal sources for a signal range that is lower than the first threshold value.

In example 9, the method as recited in example 8, wherein the lower than the first threshold is between −62 dBm to −82 dBm.

In example 10, the method as recited in example 1, wherein the determining of whether the detected signal is transmitted from the source internal to the device or from the external wireless signal source is performed while an internal long term evolution (LTE) transmission is co-running on the device.

In example 11, the method as recited in example 10, wherein the detected signal is assumed to be an external signal when the determining is performed while the LTE transmission is not co-running on the device.

Example 12 is a device transceiver comprising: a signal scanner configured to detect and measure a received signal strength indicator (RSSI) of a signal; a histogram data block configured to store a percentage plot of different RSSIs that correspond to different external wireless signal sources for a signal range that is greater than a first threshold value; a processor configured to determine whether the detected signal is transmitted from a source internal to the device or from the external wireless signal sources; and a Wi-Fi modem configured to transmit Wi-Fi signals in response to a determination of the detected signal that is transmitted from the source internal to the device.

In example 13, the device transceiver as recited in example 12, wherein the first threshold value is −62 dBm.

In example 14, the device transceiver as recited in example 12, wherein the histogram data block is configured to collect and store data when an internal long term evolution (LTE) transmission on the device is not active.

In example 15, the device transceiver as recited in example 12, wherein the processor is further configured to determine whether the detected signal is transmitted from the source internal to the device or from an external Wi-Fi signal source in a case where the detected RSSI of the signal is lesser than the first threshold value.

Example 16 is a device comprising: an antenna; a transceiver coupled to the processor, the transceiver further comprises: a signal scanner configured to detect and measure a received signal strength indicator (RSSI) of a signal; a histogram data block configured to store a percentage plot of different RSSIs that correspond to different external wireless signal sources for a signal range that is greater than a first threshold value, wherein the external wireless sources is limited to a wireless fidelity (Wi-Fi) signal source for the signal range that is lesser than the first threshold value; a processor configured to determine whether the detected signal is transmitted from a source internal to the device or from the external wireless signal sources in a case where the detected signal is greater than the threshold value; and a Wi-Fi modem configured to transmit Wi-Fi signals in response to a determination of the detected signal that is transmitted from the source internal to the device in the case where the detected signal is greater than the threshold value.

In example 17, the device as recited in example 16, wherein the Wi-Fi modem defers the Wi-Fi signal transmission in a case where the detected signal is transmitted from the external Wi-Fi signal source for the signal range that is lesser than the first threshold value.

In example 18, the device as recited in example 16, wherein the Wi-Fi modem does not transmit the Wi-Fi in response to a determination of the detected signal that is transmitted from the external wireless signal sources in the case where the detected signal is greater than the threshold value.

In example 19, the device as recited in example 16, wherein the first threshold value is −62 dBm.

In example 20, the device as recited in example 16, wherein the external wireless signal sources include any wireless transmission.

What is claimed is:

1. A method of wireless fidelity (Wi-Fi) Clear Channel Assessment (CCA) detection in a device, the method comprising:
    detecting and measuring a received signal strength indicator (RSSI) of a signal;
    comparing the measured RSSI of the detected signal to a first threshold value;
    determining whether the detected signal is transmitted from a source internal to the device or from an external wireless signal source in response to the measured RSSI that is greater than the first threshold value;
    transmitting Wi-Fi signals by the device in response to a determination that the detected signal is transmitted from the source internal to the device;
    determining whether the detected signal is transmitted from the source internal to the device or from an external Wi-Fi signal source in response to the measured RSSI that is lesser than the first threshold value;

transmitting the Wi-Fi signals by the device in response to a determination that the detected signal is transmitted from the source internal to the device; and deferring Wi-Fi signal transmission by the device in response to a determination that the detected signal is transmitted from the external Wi-Fi signal source.

2. The method as recited in claim 1, wherein the determination of whether the detected signal is transmitted from the source internal to the device implements a histogram data block.

3. The method as recited in claim 1, wherein the first threshold value is −62 dBm.

4. The method as recited in claim 3, wherein stored contents of the histogram data block for a signal range that is greater than the first threshold value include the RSSI of different external wireless signal sources.

5. The method as recited in claim 3, wherein the histogram data collects and stores data when an internal long term evolution (LTE) transmission on the device is not active.

6. The method as recited in claim 3, wherein the stored contents of the histogram data block for a signal range that is lesser than the first threshold value include the RSSI of different external Wi-Fi signal sources.

7. The method as recited in claim 1, wherein the determining of whether the detected signal is transmitted from the source internal to the device or from the external wireless signal source is based from stored contents of a histogram data block that comprise identification features of different external wireless signal sources for a signal range that is greater than the first threshold value.

8. The method as recited in claim 1, wherein the determining of whether the detected signal is transmitted from the source internal to the device or from the external Wi-Fi signal source is based from stored contents of a histogram data block that comprise identification features of different external Wi-Fi signal sources for a signal range that is lower than the first threshold value.

9. The method as recited in claim 8, wherein the lower than the first threshold is between −62 dBm to −82 dBm.

10. The method as recited in claim 1, wherein the determining of whether the detected signal is transmitted from the source internal to the device or from the external wireless signal source is performed while an internal long term evolution (LTE) transmission is co-running on the device.

11. The method as recited in claim 10, wherein the detected signal is assumed to be an external signal when the determining is performed while the LTE transmission is not co-running on the device.

12. A device transceiver comprising:
a signal scanner configured to detect and measure a received signal strength indicator (RSSI) of a signal;
a histogram data block configured to store a percentage plot of different RSSIs that correspond to different external wireless signal sources for a signal range that is greater than a first threshold value;
a processor configured to determine whether the detected signal is transmitted from a source internal to the device or from the external wireless signal sources; and
a Wi-Fi modem configured to transmit Wi-Fi signals in response to a determination of the detected signal that is transmitted from the source internal to the device.

13. The device transceiver as recited in claim 12, wherein the first threshold value is −62 dBm.

14. The device transceiver as recited in claim 12, wherein the histogram data block is configured to collect and store data when an internal long term evolution (LTE) transmission on the device is not active.

15. The device transceiver as recited in claim 12, wherein the processor is further configured to determine whether the detected signal is transmitted from the source internal to the device or from an external Wi-Fi signal source in a case where the detected RSSI of the signal is lesser than the first threshold value.

16. A device comprising:
an antenna;
a transceiver coupled to the processor, the transceiver further comprises:
a signal scanner configured to detect and measure a received signal strength indicator (RSSI) of a signal;
a histogram data block configured to store a percentage plot of different RSSIs that correspond to different external wireless signal sources for a signal range that is greater than a first threshold value, wherein the external wireless sources is limited to a wireless fidelity (Wi-Fi) signal source for the signal range that is lesser than the first threshold value;
a processor configured to determine whether the detected signal is transmitted from a source internal to the device or from the external wireless signal sources in a case where the detected signal is greater than the threshold value; and
a Wi-Fi modem configured to transmit Wi-Fi signals in response to a determination of the detected signal that is transmitted from the source internal to the device in the case where the detected signal is greater than the threshold value.

17. The device as recited in claim 16, wherein the Wi-Fi modem defers the Wi-Fi signal transmission in a case where the detected signal is transmitted from the external Wi-Fi signal source for the signal range that is lesser than the first threshold value.

18. The device as recited in claim 16, wherein the Wi-Fi modem does not transmit the Wi-Fi in response to a determination of the detected signal that is transmitted from the external wireless signal sources in the case where the detected signal is greater than the threshold value.

19. The device as recited in claim 16, wherein the first threshold value is −62 dBm.

20. The device as recited in claim 16, wherein the external wireless signal sources include any wireless transmission.

* * * * *